United States Patent [19]
Hefferen et al.

[11] Patent Number: 5,988,860
[45] Date of Patent: Nov. 23, 1999

[54] SYSTEM AND METHOD FOR DIRECTING AIR FLOW HAVING A SASH

[75] Inventors: Peter J. Hefferen; Christopher E. Kikta, both of Pittsburgh; John F. Wiedmann, Sewickley, all of Pa.

[73] Assignee: Innovex Technologies, Inc., Turtle Creek, Pa.

[21] Appl. No.: 08/683,799

[22] Filed: Jul. 18, 1996

[51] Int. Cl.⁶ .............................. F23J 11/12; G05D 7/06
[52] U.S. Cl. ............................. 364/528.11; 364/528.12; 364/528.17; 236/49.3; 454/58
[58] Field of Search .............................. 364/505, 242.95, 364/528.11, 528.12, 528.17, 528.1; 454/61, 56, 57, 58, 59, 62, 238, 239, 229, 255, 256, 340; 236/49.3

[56] References Cited

U.S. PATENT DOCUMENTS

| | | | |
|---|---|---|---|
| 5,215,497 | 6/1993 | Drees | 454/61 |
| 5,312,297 | 5/1994 | Dieckert et al. | 454/238 |
| 5,439,414 | 8/1995 | Jacob | 454/61 |
| 5,470,275 | 11/1995 | Jacob et al. | 454/61 |

*Primary Examiner*—Melanie Kemper
*Attorney, Agent, or Firm*—Ansel M. Schwartz

[57] ABSTRACT

A system for directing air flow in a fume hood having a sash includes a mechanism for producing an output control signal corresponding to a desired flow of air through the sash of the fume hood. The producing mechanism includes a CPU which actively produces the output control signal and is disposed in fluid communication with the fume hood. The system also includes a mechanism for controlling air flow through the sash of the fume hood corresponding to the output control signal. The controlling mechanism is connected to the producing mechanism to receive the output control signal and includes a CPU which actively produces a drive signal for operating the controlling mechanism corresponding to the output control signal. A corresponding method for controlling the air flow in a fume hood is also provided. Also a corresponding system for maintaining a desired relationship regarding air between a first room and a second room separated from but connected to the first room by a wall with an interface through which air can pass when the interface is in an open state is provided.

9 Claims, 8 Drawing Sheets

SYSTEM AND METHOD FOR DIRECTING AIR FLOW HAVING A SASH

FIELD OF THE INVENTION

The present invention is related to the control of air in a laboratory or a fume hood. More specifically, the present invention is related to the control of air in a laboratory or a fume hood using a distributed architecture of intelligent non-hierarchical input and output devices.

BACKGROUND OF THE INVENTION

With the primary industry emphasis on autonomous fume hood controllers and the operation of the laboratory control loop in response to their causal laboratory airflow perturbations with the resultant non-optimum laboratory loop control lag, there exists a need for a more holistic approach. Current fume hood based controllers invoke perceived control actions without any concept or regard for laboratory or neighboring fume hood(s) flow history or perceived future demands. This approach and its resultant lag has in essence rendered laboratory controllers virtually impossible to setup and tune for any reasonably wide turndown range for any but the simplest (and mostly inaccurate) opening size based analog positioning systems.

If the laboratory is assumed to be the primary control loop and the individual hoods/sashes and exhaust dampers are assumed to be just a varied group of controllable exhaust vents, with make-up air loops on individual hoods (if applicable) and supply fans/dampers just another varied group of input vents, and laboratory differential pressure (inside lab/outside lab) an indication of room door(s) flow direction then perhaps a more straightforward and effective control strategy will result.

With a neuron-based approach, the generated network variables to/from all neurons will appear on the network with the resultant binding of certain variables for localized individual input/exhaust vent control and the binding of (laboratory) global variables for whole system control will result in a flatter, more timely architecture than what currently exists. With the binding of all local hood desired flow variables into a lab total exhaust demand variable at the same time as the local hood exhaust intelligent actuators are receiving the same desired flow variable will allow the lab control neuron (possibly the same product with a different superset application as the hood differential airflow sensor neuron since it too will measure differential pressure within/without the lab) to determine and effect the remaining damper/vents in conjunction with uncontrolled openings (doors et. al.) at essentially the same time.

In essence the command to the lab systems supply and auxiliary exhaust vents intelligent actuators will occur simultaneously with the command to the individual intelligent actuators bound to individual (hood) exhaust dampers. All the laboratory actuators will slew in concert with each other. The laboratory will truly be just one system with some local damper actuators (hoods) having certain minimums and maximums that must be maintained (actually no different than just about any flow controlling damper anyway). In addition, the automatic sash closure strategy is best handled at the laboratory level in a non-autonomous fashion.

Since the laboratory is the main application with localized subset applications, the inclusion of a meaningful/integral smoke/fire control strategy is as straightforward as the inclusion of the laboratory into the building HVAC/lighting control strategy. In essence, the present invention is a fully distributed architecture.

The concept of a fully distributed architecture of intelligent non-hierarchical input (sensors) and output (actuation) devices is predicated on the existence of a 'flat architecture' in which intelligent devices act as peers communicating the sensible status of a process and implementing resultant controlling adjustments in response without the intervention of a superior hierarchical controller. In this architecture, inputs such as sash position sensors, air flow sensors, human presence sensors each has its own intelligence and communications capabilities in order to exist on a network with similarly intelligent and communication capable output devices such as intelligent dampers, intelligent VEnturi valves, intelligent actuators or intelligent sash closure devices such that complete process control actions can be implemented without the intervention or independent coordination of a 'controlling element' which occupies a superior position in networking or calculation. In this 'flat architecture' intelligent inputs and intelligent outputs act as peers in a non-hierarchial network and exchange sensed and controlling information in a configurable network which envisions single process loop control (such as a fume hood) and multiple process loop control (such as laboratories with multiple hoods) or arbitrarily configurable process loops to create 'virtual applications'.

In this approach, the elements of input and output have the means of calculation or communication resident on them and integral to them. This method using distributed elements necessary to a process application where those elements can share a non-hierarchial high speed network in which a single control loop including one or more input or output, or more than one control loop which incorporates inputs and/or outputs which may be simultaneously used by more than one loop or calculation or application, allows the global sharing of sensed elements and the fuller, faster implementation of final control actions. Other approaches envision inputs and outputs that are digital or analog which are connected to a hierarchically superior 'controller' which manages the inputs and outputs using their values as elements in calculations or electronics which determine final control actions. Subsequently, the 'controller' may communicate with other 'controllers' in a network of 'controllers' which may share sensed or calculated values in order to accomplish global control strategies. In that approach, the inputs and output have no inherent or integral intelligence or communications capabilities.

This new approach increases the speed of communications, improves access to shared inputs and values, and removes significant cost elements required in hierarchical networks or global control applications.

SUMMARY OF THE INVENTION

The present invention pertains to a system for directing air flow in a fume hood having a sash. The system comprises means or a mechanism for producing an output control signal corresponding to a desired flow of air through the sash of the fume hood. The producing mechanism comprises a producing CPU which actively produces the output control signal. The producing mechanism is to be disposed in fluid communication with the fume hood. The system also comprises means or a mechanism for controlling air flow through the sash of the fume hood corresponding to the output control signal. The controlling mechanism is connected to the producing mechanism to receive the output control signal. The controlling mechanism comprises a controlling CPU which actively produces a drive signal for operating the controlling mechanism corresponding to the output control signal.

The present invention pertains to a method for controlling air flow in a fume hood. The method comprises the steps of measuring air flow in a fume hood to identify a measured air flow. Then, there is the step of producing a network variable corresponding to a desired flow of air through the fume hood based on the measured air flow with a producing processor. Next, there is the step of transmitting the network variable over a network. Then, there is the step of receiving the network variable at a device with a controlling processor which controls air flow through the fume hood. Next, there is the step of controlling the air flow through the fume hood with the device based on the network variable which has been processed by the controlling processor.

The present invention pertains to a system for maintaining a desired relationship regarding air. The system comprises a first room. The system also comprises a second room separated from but connected to the first room by a wall with an interface through which air could pass when the interface is in an open state. The first room has means or a mechanism for producing a network variable corresponding to a desired condition of air in the first room so air will only flow from the second room into the first room. The first room also has means or a mechanism for controlling the condition of the air in the first room based on the network variable received from the producing means or mechanism. The system comprises a network to which the producing means or mechanism and the controlling means or mechanism are connected to communicate with each other.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 5:
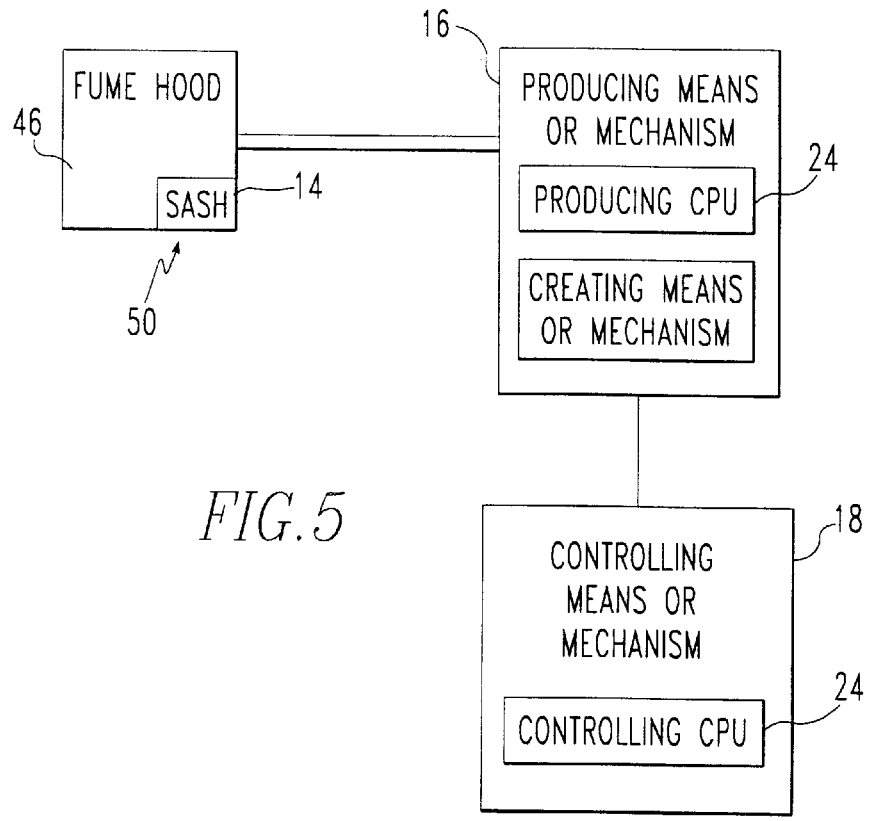
FIG. 5 is a schematic representation of a system of the present invention.

Referring now to the drawings wherein like reference numerals refer to similar or identical parts throughout the several views, and more specifically to FIG. 5 thereof, there is shown a schematic representation of a system 10 for directing air flow in a fume hood 12 having a sash 14. The system 10 comprises means or a mechanism for producing an output control signal corresponding to a desired flow of air through the sash 14 of the fume hood 12. The producing means or mechanism 16 comprises a producing CPU 24 which actively produces the output control signal. The producing means or mechanism 16 is to be disposed in fluid communication with the fume hood 12. The system 10 also comprises means or a mechanism for controlling air flow through the sash 14 of the fume hood 12 corresponding to the output control signal. The controlling means or mecha-nism 18 is connected to the producing means or mechanism 16 to receive the output control signal. The controlling means or mechanism 18 comprises a controlling CPU 24 which actively produces a drive signal for operating the controlling means or mechanism 18 corresponding to the output control signal.

The producing means preferably comprises means or a mechanism for creating an air flow signal corresponding to the air flow through the fume hood 12. The air flow signal is provided to the producing CPU 24. The producing CPU 24 is connected to the creating means or mechanism 20. The creating means or mechanism 20 preferably comprises an air foil pitot 26 in contact with the fume hood 12 and in communication with the producing CPU 24. The air foil pitot 26 detects the air pressure in regard to the fume hood 12. See U.S. Pat. No. 5,415,583, incorporated by reference herein, for a full description of an air foil pitot and a fume hood. The air foil pitot 26 is in communication with the producing CPU 24. Besides an air foil pitot 26, other sensors which identify air flow through the fume hood 12 can be used. Examples of such sensors are sash 14 position sensors or flow sensors which produce a signal corresponding to the flow of air through the fume hood 12, as is well known in the art. Additionally, the creating means or mechanism 20 preferably comprises an ultra-low differential pressure sensor 28 connected to the air foil pitot 26 and the producing CPU 24 which creates the air flow signal.

The controlling means or mechanism 18 preferably comprises an actuator 30 in which the controlling CPU 24 is disposed and is operated by the drive signal. Moreover, the controlling means or mechanism 18 comprises a damper 34 connected to the actuator 30 which is operated by the actuator 30. The position of the damper 34 controls flow of air through a duct, as is well known in the art. Alternatively, a blower instead of a clamper can be used to control the flow of air through a duct connected to the fume hood.

Figure 4:
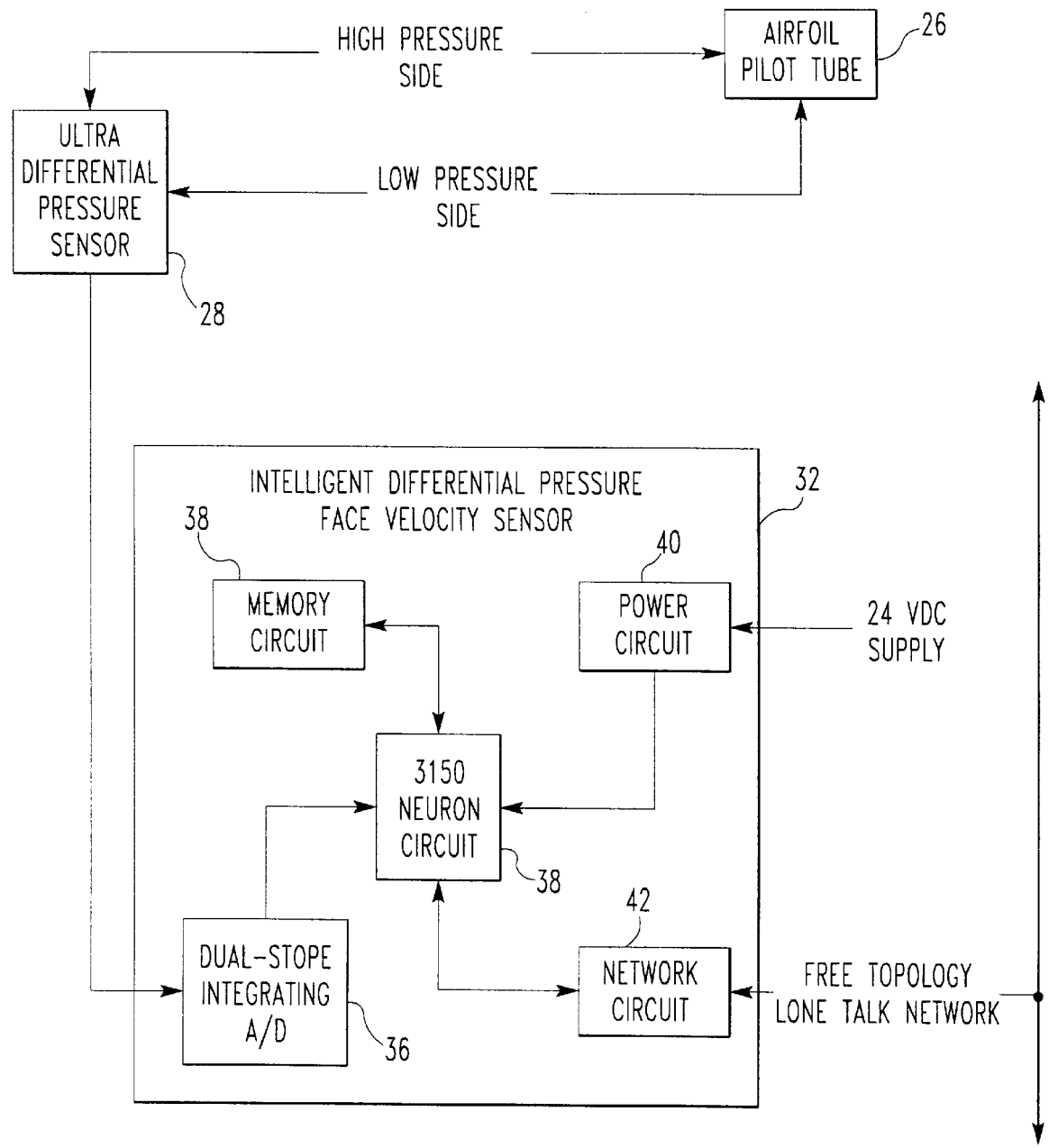
FIG. 4 is a schematic representation of the major components of a differential pressure face velocity sensor.

Referring to FIG. 4, the producing means or mechanism 16 preferably comprises a differential face velocity sensor 32. The producing CPU 24 is disposed in the producing means or mechanism 16. Preferably, the differential face velocity sensor 32 comprises a dual-slope integrating A/D converter 36 for converting analog signals to digital signals. Additionally, the differential face velocity sensor 32 comprises a neuron circuit 38 which produces a network variable which corresponds to a flow of air. The neuron circuit 38 is connected to the dual-slope integrating A/D converter 36. There is a memory circuit 38 for storing code which the neuron circuit 38 processes. The memory circuit 38 is connected to the neuron circuit 38. Moreover, the differential face velocity sensor 32 comprises a power circuit 40 for providing power to the neuron circuit 38 and is connected to the neuron circuit 38. Also, the differential face velocity sensor 32 comprises a network circuit 42 for communicating with a network and to provide the network variable to the network. The network circuit 42 is in connection with the neuron circuit 38.

The present invention pertains to a method for controlling air flow in a fume hood 12. The method comprises the steps of measuring air flow in a fume hood 12 to identify a measured air flow. Then, there is the step of producing a network variable corresponding to a desired flow of air through the fume hood 12 based on the measured air flow with a producing processor. Next, there is the step of transmitting the network variable over a network. Then, there is the step of receiving the network variable at a device with a controlling processor which controls air flow through the fume hood 12. Next, there is the step of controlling the air flow through the fume hood 12 with the device based on the network variable which has been processed by the controlling processor.

Figure 6:
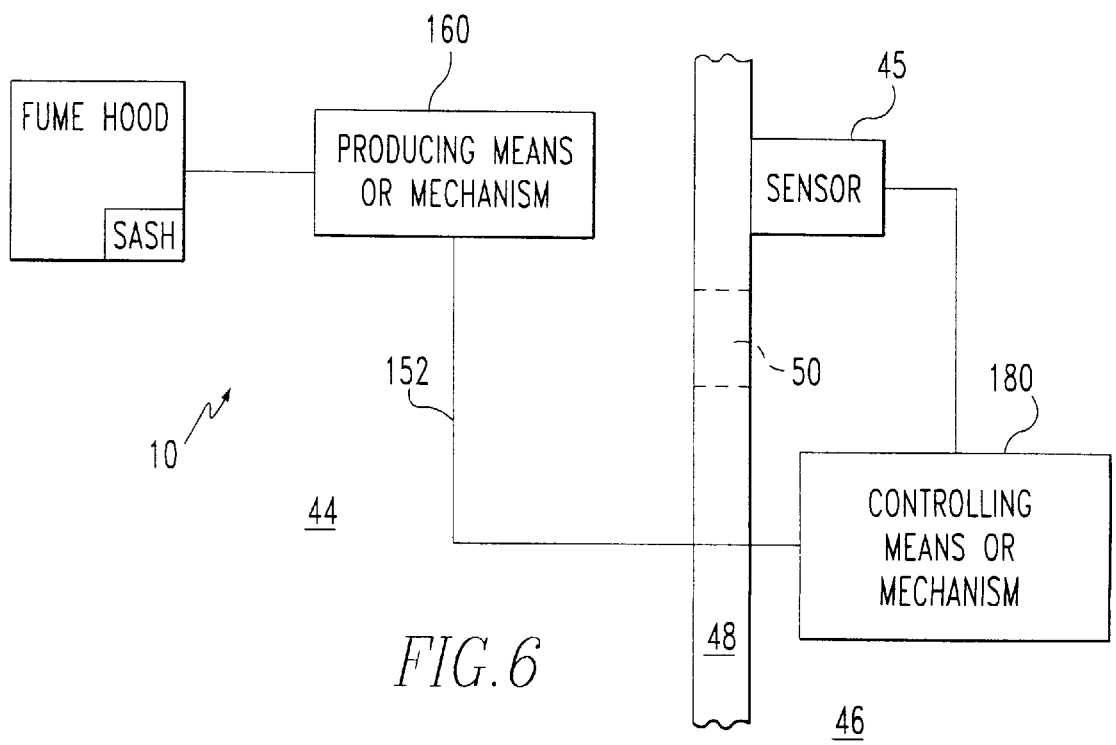
FIG. 6 is a schematic representation of a system of the present invention.
Figure 7:
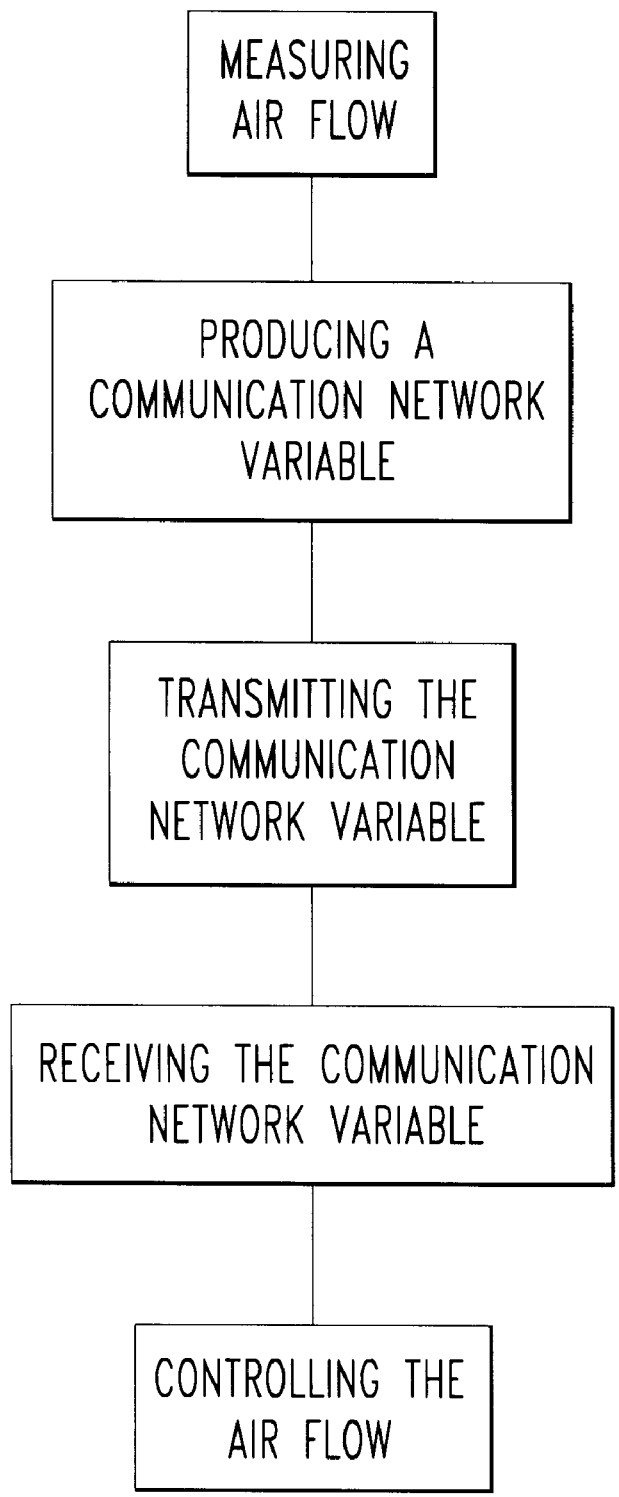
FIG. 7 is a flow chart of a method of the invention.

The present invention pertains to a system 10 for maintaining a desired relationship regarding air, as shown in FIG. 6. The system 10 comprises a first room 44. The system 10 also comprises a second room 46 separated from but connected to the first room 44 by a wall 48 with an interface 50 through which air could pass when the interface 50 is in an open state. The interface 50 can be a door, window or preferably a fume hood 12 sash 14. The first room 44 has means or a mechanism for producing a network variable corresponding to a desired condition of air in the first room 44 so, preferably, air will only flow from the second room 46 into the first room 44. The condition can be humidity, for instance, or preferably pressure. The first room 44 also has means or a mechanism for controlling the condition of the air in the first room 44 based on the network variable received from the producing means or mechanism 160. The system 10 comprises a network 52 to which the producing means or mechanism 160 and the controlling means or mechanism 180 are connected to communicate with each other. The system 10 can preferably also include a sensor 45, such as a pressure sensor in communication and preferably disposed in the second room. The sensor can be a pressure sensor connected to the controlling means or mechanism. The controlling means or mechanism can use the pressure of the second room as a reference and cause the pressure in the first room to be less than the pressure in the second room by controlling the flow of air through, for instance, a duct with a damper out of the second room. Alternatively, the controlling means or mechanism can use the sensor in the second room to make sure the pressure is always greater in the first room than the second room in the same manner as previously described.

In the operation of the invention, the Intelligent Differential Pressure Face Velocity Sensor calculates the face velocity at the sash. The face velocity sensor must be used with an ultra-low differential pressure transmitter, which is responsible for converting the high and low port pressures to a 4–20 mA analog signal. An example of the typical configuration used with the Face Velocity Sensor is shown in FIG. 1.

A 3150 Neuron Processor is the basis of the face velocity sensor. A dual-slope integrating converter converts the 4–20 mA analog differential pressure to a digital value. The converter interface software is simplified, since the Neuron Processor has a pre-defined software object for the dual-slope integrating converter. A program converts the differential pressure value to face velocity through a formula. Another program uses this face velocity and a PID loop to calculate a actuator response network variable. See the Appendix for the application program which operates the face velocity sensor. See the Neuron C Reference Guide and the Neuron C Programmer's Guide, both of which are incorporated by reference herein, by Echelon Corp. 4015 Miranda Avenue, Palo Alto, Calif. 94304, for a complete explanation of the operation of the 3150 Neuron Processor, programming, networking, protocols, etc.

Figure 1:
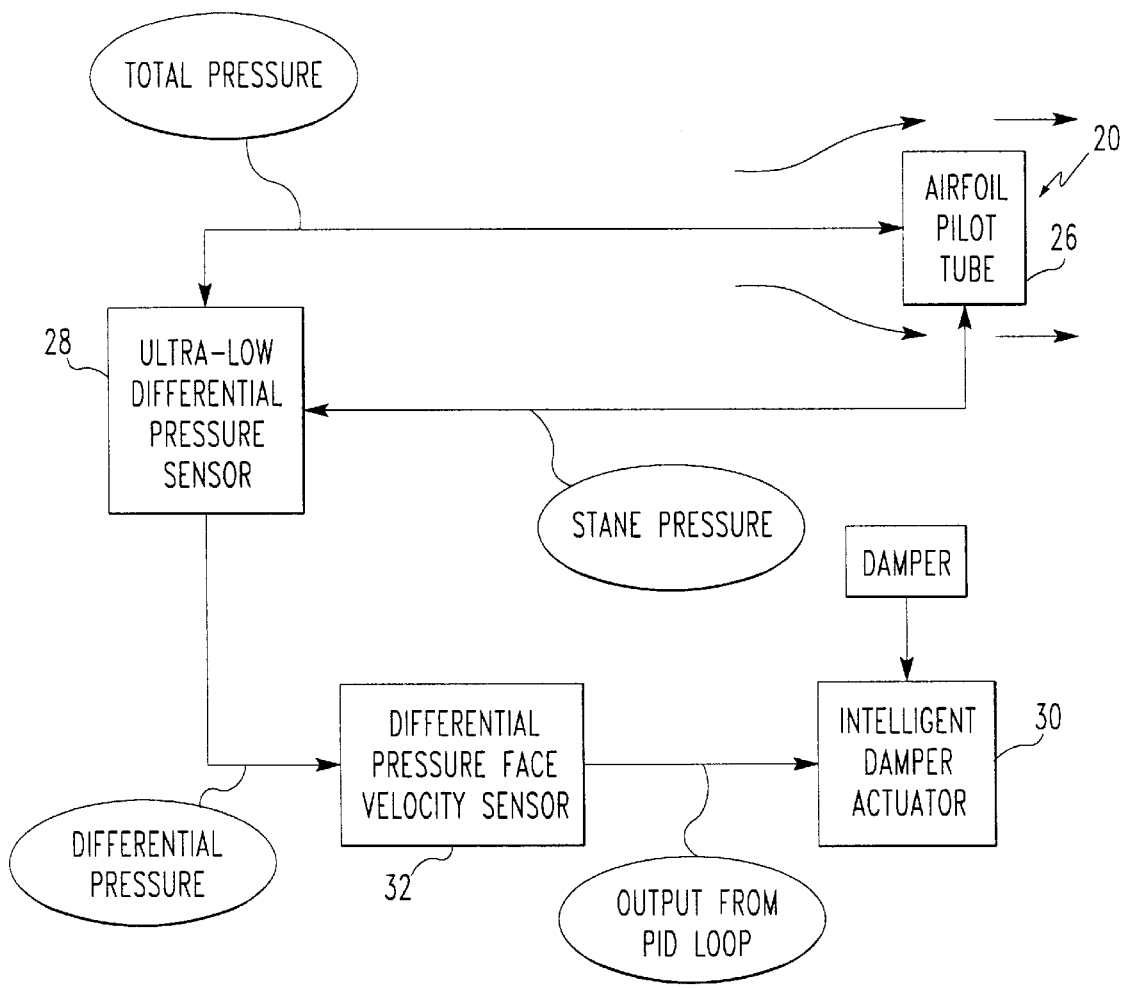
FIG. 1 is a schematic of an information flow diagram for a distributed architecture of intelligent non-hierarchical input and output devices.

As FIG. 1 illustrates, there are 5 major components to the Intelligent Differential Pressure Face Velocity Sensor, the 3150 Neuron Processor Circuit, Memory Circuit, Power Circuit, Network Circuit, and the Dual-Slope Integrating A/D. Each of these components are discussed in the following sub-sections.

The 3150 Neuron Processor Circuit is composed of the 3150 Neuron Processor and support for the clock, service pin, and reset.

The 3150 Neuron Processor is the major component of the face velocity sensor. The 3150 Neuron Processor is composed of three separate logical units, the Media Access Control (MAC) Processor, Network Processor, and the Application Processor.

The MAC Processor handles layers one and two of the seven-layer network protocol stack. This includes driving the communications subsystem hardware as well as executing the collision avoidance algorithm. The MAC Processor works in conjunction with the Network Processor and they communicate using network buffers located in the onboard shared memory.

The Network Processor implements layers three through six of the network protocol stack. It handles network variable processing, addressing, transaction processing, authentication, background diagnostics, software timers, network management, and routing functions. The Network Processor works in conjunction with the Application Processor and they communicate using application buffers located in the onboard shared memory.

The Application Processor implements layer seven of the network protocol stack and executes the operating system and the application code. The operating system consists of a built-in multitasking scheduler which allows for parallel events.

The clock support is a simple circuit which provides a clock input to the 3150 Neuron Processor and the FTT-10 Free Topology Transceiver. The clock support circuit consists of a 10 MHZ crystal, capacitors, and two resistors. This circuit is recommended by the Echelon Corporation.

The service support is a circuit which provides an indicator of the service status and a means for generating a service request across the network. A service request is necessary for configuring the LONTalk network with an "off the self" network management tool. The service pin support consists of a LED, resistor, and a push button.

The reset circuit is a standard Low Voltage Indication (LVI) Circuit using a MC33164-5 LVI part, capacitor, and a 74AC00 NAND Logic Gate. The LVI provides a clean reset and under voltage protection to the Neuron Processor, Memory, and Network Transceiver. The NAND gate is used to prevent bus contention between the Neuron Processor and the Memory by delaying the reset signal to the memory.

The memory circuit is composed of a MCM606C 32K×8 SRAM part, a 29C257-120 64K×8 FLASH part, a 74AC00 NAND Logic Gate, and a 74AC32 AND Logic Gate. The SRAM provides additional RAM to the Neuron Processor and it is mapped into memory at 0xDFFF to 0x8000. The FLASH provides code space for the Application and System Images. The application image is the user program and any additional standard Neuron Processor library functions and is executed by the Application Processor. The System image is the code which is executed by the MAC and Network Processors. The Logic Gates provide the logic used to decode the memory space, control the select lines, and control the output enables.

The Power Circuit is composed of a LM2574M-5V Switching Regulator, capacitors, a Zener Diode, a Diode, and an Inductor. This circuit is a common power supply circuit.

The Network Circuit is composed of a FTT-10 Free Topology Transceiver, capacitors, and surge protectors.

The Dual-Slope Integrating A/D is composed of OP Amps, resistors, capacitors, and an CD4016 Analog Switch. This circuit is recommended by the Echelon Corporation for supporting the Dual-Slope Integrating A/D object.

Figure 2:
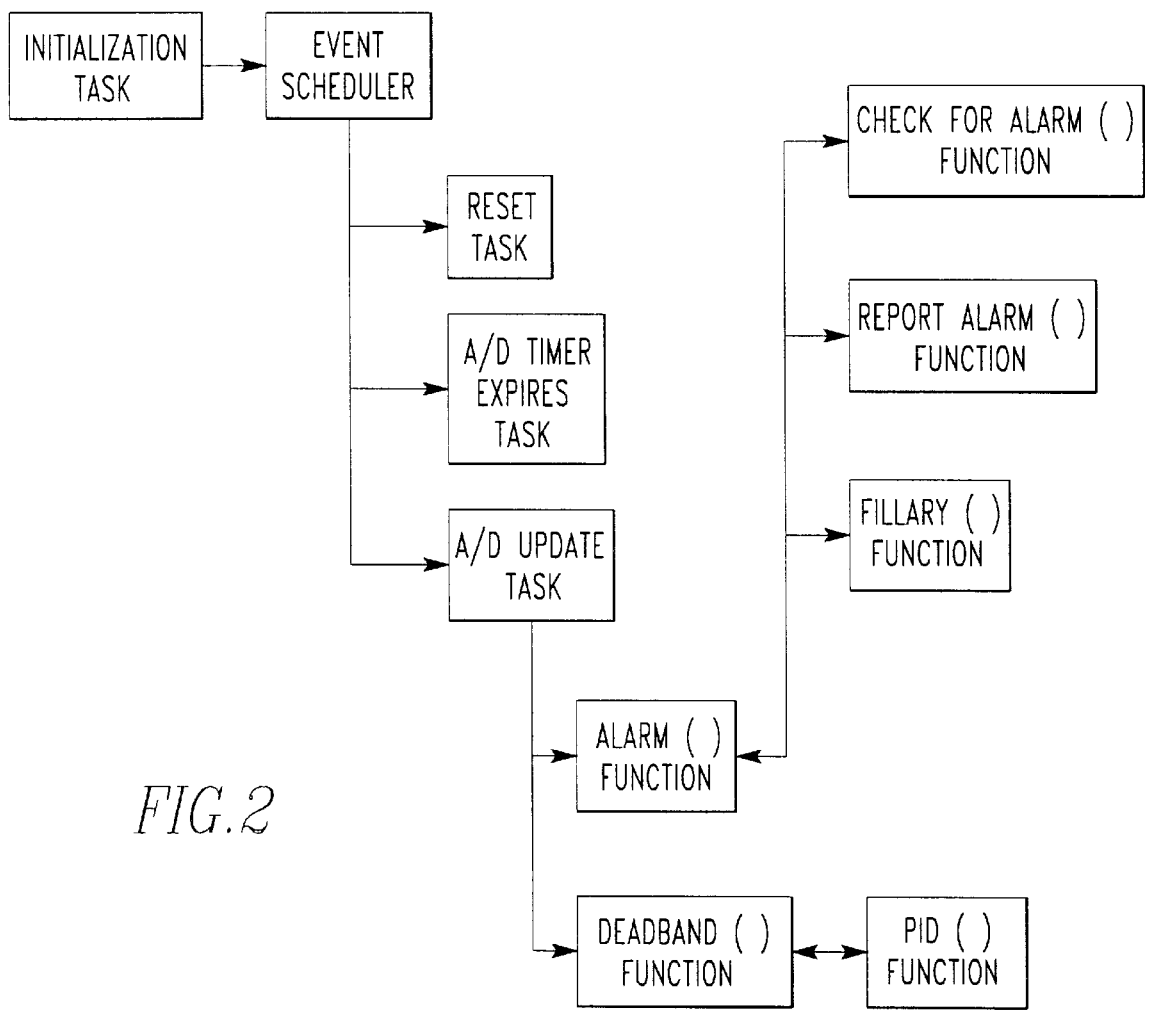
FIG. 2 is a schematic representation of the major software components of a face velocity sensor.

The 3150 Neuron simplifies software development, since many device drivers are pre-written as I/O objects. FIG. 2 illustrates the major components of the application program for the Face Velocity Sensor.

The Initialization Task 51 is automatically run after the Face Velocity Sensor is reset or powered on. The Initialization Task allocates memory and sets default values for Network Variables, Input/Output Objects, Timer Objects, Global Variables, Network Buffers, and Application Buffers. After the Initialization Task executes it passes control over to the event scheduler 52.

Network Variables are similar to Global Variables in 'C', but Network Variables can be sent or received by other LONWorks controllers on the LONTalk network. The Neuron Processor takes care of sending and receiving Network Variables, but a Network configuration Tool is necessary to link network variables between controllers. There are two basic type of network variables, input and output. Input network variables receive their values from other controllers on the network. Output network variables send their values to other controllers on the network.

The Face Velocity Sensor has the following system network variables:

| Name | Direction | Type | Description |
| --- | --- | --- | --- |
| nviDateTime | input | SNVT_time_stamp | System Date and Time |
| nvoAlarmStatus | output | SNVT_alarm | Face Velocity Alarm Status |
| nviEmergency | input | SNVT_switch | Emergency Status |
| nviEmerPosition | output | SNVT_lev_cont_f | Damper Emergency Position |
| nviName | input | SNVT_str_asc | Controller Name |

The nviDateTime network variable is used for receiving the current date and time. The Face Velocity Sensor does not have a real time clock, so it is dependent on another controller to broadcast the date and time on the network. The face velocity sensor uses the date and time to time stamp face velocity alarms.

The nviAlarmStatus network variable is used for reporting the high and low face velocity alarms. The alarm status is very robust and it includes a date and time stamp when the alarm occurred, the face velocity value, the alarm limit, type of the alarm (high limit, high limit return, low limit, low limit return, no alarm condition), and the name of the controller.

The nviEmergency and nviEmerPosition network variables are used to control the damper actuator when there is an emergency condition is broadcast on the network. The nviEmergency variable receives the emergency status. When there is an emergency, nviEmerPosition is the position for the PID loop's output.

The nviName network variable is the name of the controller and its default is "Hood_1".

The Face Velocity Sensor has the following network variables for converting the raw voltage representing the differential pressure to a face velocity in engineering units:

| Name | Direction | Type | Description |
| --- | --- | --- | --- |
| nviFVReadRate | input | SNVT_count | Update Rate for A/D Converter |
| nviDPLowScale | input | SNVT_speed_f | Low Scaling Value for Diff. Pressure |
| nviDPHighScale | input | SNVT_speed_f | High Scaling Value for Diff. Pressure |
| nviFVLowLimit | input | SNVT_speed_f | Face Velocity Low Alarm Limit |
| nviFVHighLimit | input | SNVT_speed_f | Face Velocity High Alarm Limit |
| nvoFaceVelocity | output | SNVT_speed_f | Face Velocity Value |

The nviFVReadRate network variable is the scan rate for the A/D converter. The scan rate should never be less than 20 which is 20 milliseconds. The scan rate has the units of milliseconds.

The nviDPLowScale and nviDPHighScale network variables are the high and low scaling values for converting the raw counts (0 to 65535) to a differential pressure. The Face Velocity sensor is assuming a 0 to 5 Volt linear differential pressure transmitter. If a different differential pressure transmitter wants to be used, the LOW_COUNTS and HIGH_COUNTS defines in the application code must be changed. The LOW_COUNTS (0) define corresponds to the low scaling value and the HIGH_COUNTS (65535) corresponds to the high scaling value. The differential pressure is calculated from the raw counts using the following equation:

$$\text{Differential Pressure} = \frac{(\text{Raw Counts} - \text{LOW\_COUNTS}) \times (nviDP\text{HighScale} - nviDP\text{LowScale})}{(\text{HIGH\_COUNTS} - \text{LOW\_COUNTS})} + nviDP\text{LowScale}$$

The nviFVLowLimit and nviFVHighLimit network variables define the face velocity's low and high alarm limits, respectively. When the face velocity is below the low alarm limit, a low limit alarm is generated. When the face velocity returns to a value above the low alarm limit, a low limit return is generated. When the face velocity is above the high alarm limit, a high limit alarm is generated. When the face velocity returns to a value below the high alarm limit, a high limit return is generated.

The nvoFaceVelocity network variable is the calculated face velocity. The face velocity is calculated from the differential pressure using the following equation:

$$nvo\text{FaceVelocity} = 4.037\sqrt{\text{Differential Pressure}}$$

The Face Velocity Sensor has a built in PID control routine which has the following network variables for controlling the damper actuator:

| Name | Direction | Type | Description |
| --- | --- | --- | --- |
| nviPIDSetpoint | input | SNVT_speed_f | Control Setpoint |
| nviPIDProp | input | SNVT_lev_cont_f | Proportional Gain |
| nviPIDIntegral | input | SNVT_lev_cont_f | Integral Gain |
| nviPIDDerivative | input | SNVT_lev_cont_f | Derivative Gain |
| nviPIDDeadband | input | SNVT_speed_f | Deadband |
| nviPIDSign | input | SNVT_count_inc | Control Sign (+1 = Forward, −1 = Reverse) |
| nviPIDEnable | input | SNVT_switch | PID Loop Enable |

| Name | Direction | Type | Description |
|---|---|---|---|
| nvoPIDOut | output | SNVT_lev_cont_f | Output from PID Loop (0 to 100%) |

The nviPIDSetpoint network variable is the control setpoint for the PID loop. The PID loop controls the face velocity through the nvoPIDOut network variable. The PID loop's output is broadcast on the network and the damper actuator controller receives this value and uses it to modulate its damper. The PID output is a percentage from 0 to 100%.

The nviPIDEnable network variable is used for disabling and enabling PID control. The nviPIDSign network variable controls if the PID loop is forward or reverse acting. The control sign is an integer value and it can have a value of −1 or +1. The control sign's default is +1, forward acting.

The nviPIDDeadband network variable helps to eliminate toggling the damper actuator when the face velocity is around the setpoint. When the face velocity is within the deadband around the setpoint, the PID loop does not change its output. Doing this helps to reduce wear on the damper actuator.

The nviPIDProp network variable is the proportional gain for the PID control loop.

The nviPIDIntegral network variable is the integral gain for the PID control loop.

The nviPIDDerivative network variable is the derivative gain for the PID control loop.

The Neuron processor has built-in Input/Output objects which simplify the development of controllers since the device drivers are pre-written. The Face Velocity sensor is using a dual slope A/D converter I/O object called ADCONVERTOR. This A/D converter performs measurements with 16-bits of resolution for as little as a 13 ms integration period. The ADCONVERTOR requires a millisecond timer to provide continuous A/D conversion.

The ConvertTimer millisecond timer object is provided for continuous reading of the A/D converter at the rate determined by the network variable nviFVReadRate.

The face velocity sensor defines the following constants:

| Name | Type | Description |
|---|---|---|
| LOW_COUNTS | unsigned long | Raw counts which correspond to the low scaling value |
| HIGH_COUNTS | unsigned long | Raw counts which correspond to the high scaling value |
| CONTROL_VALUE | unsigned long | Integrating period for the dual slope A/D converter |

The face velocity sensor uses the following global variables:

| Name | Type | Description |
|---|---|---|
| nviPIDSetpoint | SNVT_speed_f | Control Setpoint |
| RawCounts | unsigned long | Differential pressure in raw unscaled counts |
| DiffPressure | float_type | Calculated differential pressure |
| Error | float_type | PID Error (Setpoint - Face Velocity) |
| PrevError | float_type | PID Error from the previous PID loop's calculation |
| PPart | float_type | Proportional component of the PID loop's output |
| IPart | float_type | Integral component of the PID loop's output |
| DPart | float_tppe | Differential component of the PID loop's output |
| AIR_COEF | float_type | Coefficient of Air for face velocity calculation |
| PID_MAX_OUT | float_type | PID loop's maximum output in percent |
| PID_MIN_OUT | float_type | PID loop's minimum output in percent |
| ZERO | float_type | Zero in represented as a floating point number |

The Event Scheduler allocates processor time to the application tasks. The Event Scheduler decides when it is time to run a task, and the higher priority tasks run first such as the Reset Task 54. The Event Scheduler passes control to a task and the completed task relinquishes control to the Event Scheduler. The Event Scheduler is responsible for updating the Watchdog timer.

The Reset Task is responsible for setting up the variables and I/O objects to a know state. The timer object ConvertTimer is set to the network variable nviFVReadRate. This causes the A/D I/O object, ADCONVERTOR to be updated at the desired rate. Neuron C does not support floating point numbers. All floating point calculations are accomplished by using Echelon's floating point library. The global variables AIR_COEF, PID_MAX_OUT, PID_MIN_OUT, and ZERO are really used as defined constants and the Reset Task must initialize them to their proper values.

The timer object ConvertTimer is a repeating timer which expires at the set nviFVReadRate. The A/D Timer Expires Task 56 is responsible for starting the A/D conversion by writing the CONTROL_VALUE constant to ADCONVERTOR I/O Object.

The A/D Update Task 58 occurs when the A/D converter has completed its conversion of the unscaled differential pressure. This raw value must be converted to differential pressure that has engineering unit using the following formula:

$$\text{Differential Pressure} = \frac{(\text{Raw Counts} - \text{LOW\_COUNTS}) \times (nviDP\text{HighScale} - nviDP\text{LowScale})}{(\text{HIGH\_COUNTS} - \text{LOW\_COUNTS})} + nviDP\text{LowScale}$$

The face velocity must be calculated using the differential pressure. The following formula is used:

$$nvo\text{FaceVelocity} = 4.037\sqrt{\text{Differential Pressure}}$$

After calculating the face velocity, it is checking to make sure it is within the alarm limits. This alarm checking is done by the function Alarm( ) 60. If there is a face velocity alarm condition, it is reported by the network variable nvoAlarmStatus. If the network variable nviEmergency indicates that there is an emergency condition, the PID loop's output is driven to the emergency position indicated by the network variable nviEmerPosition. If there is no emergency condition and the PID loop is enabled by the network variable nviPIDEnable, the face velocity sensor will control the damper actuator through the function PID( ) 62. The PID loop's, setpoint, deadband, gains, and control sign are all controllable through their respective network variables. The PID loop's output is broadcast by the network variable nvoPIDOut.

The Neuron Processor has tasks that are handled by the Event Scheduler. These task are event based. To complement and provide more modularity, tasks can call functions. Functions resemble tasks, but they must be invoked by a task or another function and not the Event Scheduler. The face velocity sensor has the following functions:

| Function | Description |
|---|---|
| Alarm( ) | Checks and reports face velocity alarms |
| CheckForAlarm( )66 | Looks for face velocity alarms |
| ReportAlarm( )68 | Reports alarm conditions |
| PID( ) | Performs PID control |
| DeadBand ( )64 | Determines if the face velocity is within the deadband around the setpoint |
| FillArray ( )70 | Copies a SNVT_speed_f type value to an array of four unsigned integers |

Alarm( ) Function
　void Alarm( )
Remarks
　The Alarm( ) function reports alarm and return from alarm conditions. This function uses the high and low alarm limit network variables, nviFVLowLimit and nviFVHighLimit. Alarms are reported through the nvoAlarmStatus network variable.
Return Value(s)
　None
CheckForAlarm( ) Function
　int CheckForAlarm( )
Remarks
　The CheckForAlarm( ) function checks the face velocity network variable, nvoFaceVelocity against the high and low alarm limit network variables, nviFVLowLimit and nviFVHighLimit.
Return Value(s)
　HIGH_LIMIT_ALARM if the face velocity is above the high alarm limit.
　LOW_LIMIT_ALARM if the face velocity is below the low alarm limit.
　NO_ALARM if the face velocity is between the high and low alarm limits.
ReportAlarm( ) Function
　void
　ReportAlarm(unsigned long ObjectID alarm_type_t AlarmType priority_level_t PriorityLevel unsigned long IndexToSNVT unsigned Value[4] unsigned AlarmLimit[4])
ObjectID
　Face velocity sensor object number
AlarmType
　Type of alarm
PriorityLevel
　Priority Level for this alarm
IndexToSNVT
　Standard Network Variable Type Index for alarm value and limit
Value[4]
　Value which caused the alarm
AlarmLimit[4]
　Alarm limit
Remarks
　The ReportAlarm( ) function takes the passed parameters and fills in the alarm status network variable, nvoAlarmStatus. Along with the passed parameters, this function fills in the date and time and the face velocity sensor's name.
Return Value(s)
　None
PID( ) Function
　void PIDO
Remarks
　The PID( ) function uses a PID algorithm to control the face velocity by modulating the PID loop's output. The output from the PID loop is broadcast as a control signal to the damper actuator controller. The loop must be enabled by setting the PID loop enable to "ON". If the PID loop enable is "OFF" the PID loop's output is not updated. If the face velocity is within the deadband around the setpoint, no control action is taken and the loop's output is not changed. The PID loop can be selected to operate one of two ways, forward acting or reverse acting, by the control sign. The control sign is configurable through the nviPIDSign network variable. When the PID loop is controlling, its output is a summation of the Proportion, Integral, and Derivative components.

The Proportional component is calculated by the following formula:

$$P\text{part} = \text{Error} * nvi\text{PIDProp}$$

The Integral component is calculated by the following formula:

$$I\text{part} = I\text{part} + (nvi\text{PIDIntegral} * \text{Error})$$

The Derivative component is calculated by the following formula:

$$D\text{part} = (\text{Error} - \text{Previous Error}) * nvi\text{PIDDerivative}$$

The PID Loops output is broadcast to other damper actuator controllers on the network though the nviPIDOut network variable. Most of the time, the PID loop's output is just a summation of the all three components, Proportional, Integral, and Derivative. But, the control loop can suffer from anti-windup reset. Anti-windup reset is an over accumulation of the Integral component, since the integral component is used in its own formula. To combat this, a special check is made to ensure that the PID loop's output is clamped to the minimum or maximum output value. If the PID loop's output value is outside these limits, the Integral component is adjusted so that the total of all components equals the maximum or minimum output values. The PID loop's output is calculated by the following formulas:

$$nvo\text{PIDOut} = P\text{part} + I\text{part} + D\text{part}$$

if $nvo\text{PIDOut} > \text{PID\_MAX\_OUT}$ then $$I\text{Part} = I\text{Part} + \text{PID\_MAX\_OUT} - nvo\text{PIDOut}$$

$$nvo\text{PIDOut} = \text{PID\_MAX\_OUT}$$

else if $nvo\text{PIDOut} < \text{PID\_MIN\_OUT}$ then $$I\text{Part} = I\text{Part} + \text{PID\_MIN\_OUT} - nvo\text{PIDOut}$$

$$nvo\text{PIDOut} = \text{PID MIN\_OUT}$$

Return Value(s)
None
DeadBand( ) Function
  boolean DeadBand( )
Remarks
  The DeadBand function determines if the face velocity is within the deadband around the setpoint. The deadband is defined by the nviPIDDeadband network variable.
Return Value(s)
  TRUE, the face velocity is outside the deadband FALSE, the face velocity is inside the deadband
FillArray( ) Function
  void
  FillArray( SNVT_speed_f*value_f, unsigned int*value)
  value_f
  Pointer to the speed variable which is a floating point number to be copied.
  value
  Pointer to the unsigned four byte array to be filled by the floating point number.
Remarks
  The FillArray( ) function copies a variable which is defined as a floating point speed into a four byteThesigned array.
Return Value(s)
  None The Air Pitot Tube is placed in the moving air stream, usually mounted under the fume hood's bypass airfoil. The bypass airfoil is a metal plate which directs the airflow across the fume hood's work surface. The Airfoil Pitot Tube provides two different pressure components, total pressure and static pressure. The static pressure is the pressure which impacts all surfaces of the probe. The total pressure is the combination of the impact pressure of the airstream hitting the part of the probe facing into the airstream and the static pressure. The total pressure is measured by the sensing ports parallel to airstream and the static pressure is measured by the sensing ports perpendicular to the airstream. These two pressures are transmitted to an ultra-low differential pressure transmitter through pneumatic air lines.

The two pressures, total and static are transmitted from the Airfoil Pitot Tube to the ultra-low differential pressure transmitter. The pressure transmitter subtracts the static pressure from the total pressure to produce a differential pressure. This differential pressure is actually the velocity pressure, which is proportional to the face velocity by the following equation:

$$\text{Face Velocity} = 4.037\sqrt{\text{Velocity Pressure}}$$

The velocity pressure is in the units millimeters of water and the face velocity is in the units meters per second. The differential pressure transmitted converts the differential pressure to a linear analog signal 0 to 5 Volt signal. A 250 Ohm resistor can be used with pressure transmitters whose output is 4 to 20 mA. This voltage signal is transmitter through signal wire to the A/D Converter's terminals on the face velocity sensor.

The analog velocity pressure signal is received by the Dual-Slope Integrating A/D circuit. This circuit performs A/D measurements with 16 bits of resolution at a sample rate of 13 ms. Control of this A/D converter is quite simple, because the Dual Slope A/D Converter I/O object is provided by the Neuron Circuit. This A/D converter is discussed in detail in the Neuron C Reference Guide mentioned above.

The A/D Timer Expires Task and the A/D Update Task in the application program handles the A/D conversion. The A/D Update Task reads the raw count velocity pressure and converts it to a floating point number. The scaling values are adjustable through the network to provide flexibility with choosing the differential pressure transmitters. The following formula is used to convert the velocity pressure's raw count value to floating point value with engineering units.

Velocity Pressure =

$$(\text{Raw Counts} - \text{LOW\_COUNTS}) \times \frac{(nviDP\text{HighScale} - nviDP\text{LowScale})}{(\text{HIGH\_COUNTS} - \text{LOW\_COUNTS})} + nviDP\text{LowScale}$$

The network variables and defines are discussed in the Differential Pressure Face Velocity Sensor's design document, Hardware and Software Design.

The A/D Update Task uses the differential pressure value to calculate the face velocity by using the following equation:

$$\text{FACE VELOCITY (FV)} = \sqrt{\text{DIFFERENTIAL PRESSURE (DP)}} * 4005$$

The Alarm( ) function is called by the A/D Update Task to perform face velocity alarming. This function will broadcast high limit, high limit return, low limit, and low limit return alarms. The face velocity low and high limit alarm values are programmable through the network.

The face velocity sensor is capable of receiving emergency broadcasts on the network. This operation is done in the A/D Update Task The sensor has no provisions for detecting emergency conditions itself. If there is an emergency condition, the PID control loop will be suspended, and the emergency position value will be the PID loop's output. The emergency position value is programmable through the network.

The calculated face velocity is used by the PID( ) function to control the damper actuator. This function is invoked by the A/D Update Task. PID loop control can be disabled through the network. The PID loop uses Proportional, Integral, and Derivative Control to modulate its output. The gains associated with the PID loop are programmable through the network. To help alleviate oscillation around the setpoint, there is a deadband. If the face velocity is with the deadband around the setpoint, the PID loops output remains the same. If the face velocity is outside the deadband, the PID loop calculates the output. To prevent the integral component from becoming too large, there is anti-wind up reset protection. This protection clamps the integral value when all of the components add up to more than 100% or less than 0%. The output from the PID loop is broadcast on the network for the damper actuator controller to receive. The following equations are used for PID control:

Error=Setpoint−Face Velocity

Proportional Component=Error*Proportional Gain

Integral Component=Integral Component+(Integral Gain*Error)

Derivative Component=(Error−Previous Error)*Derivative Component

PID Output=Proportion Component+Integral Component+Derivative Component

Figure 3A:
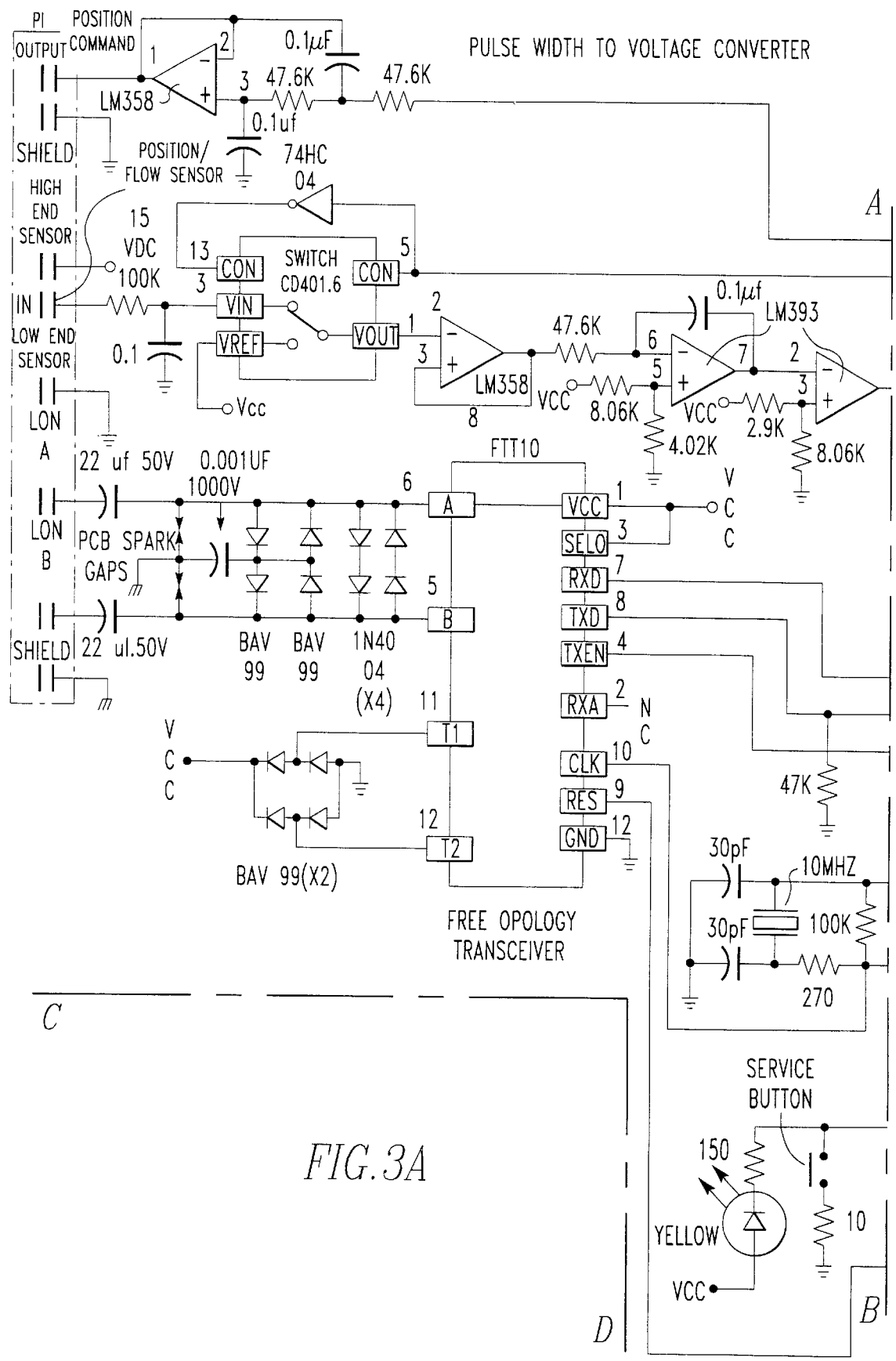
FIGS. 3a, 3b and 3c are schematic representations of the circuit for the intelligent actuator.
Figure 3B:
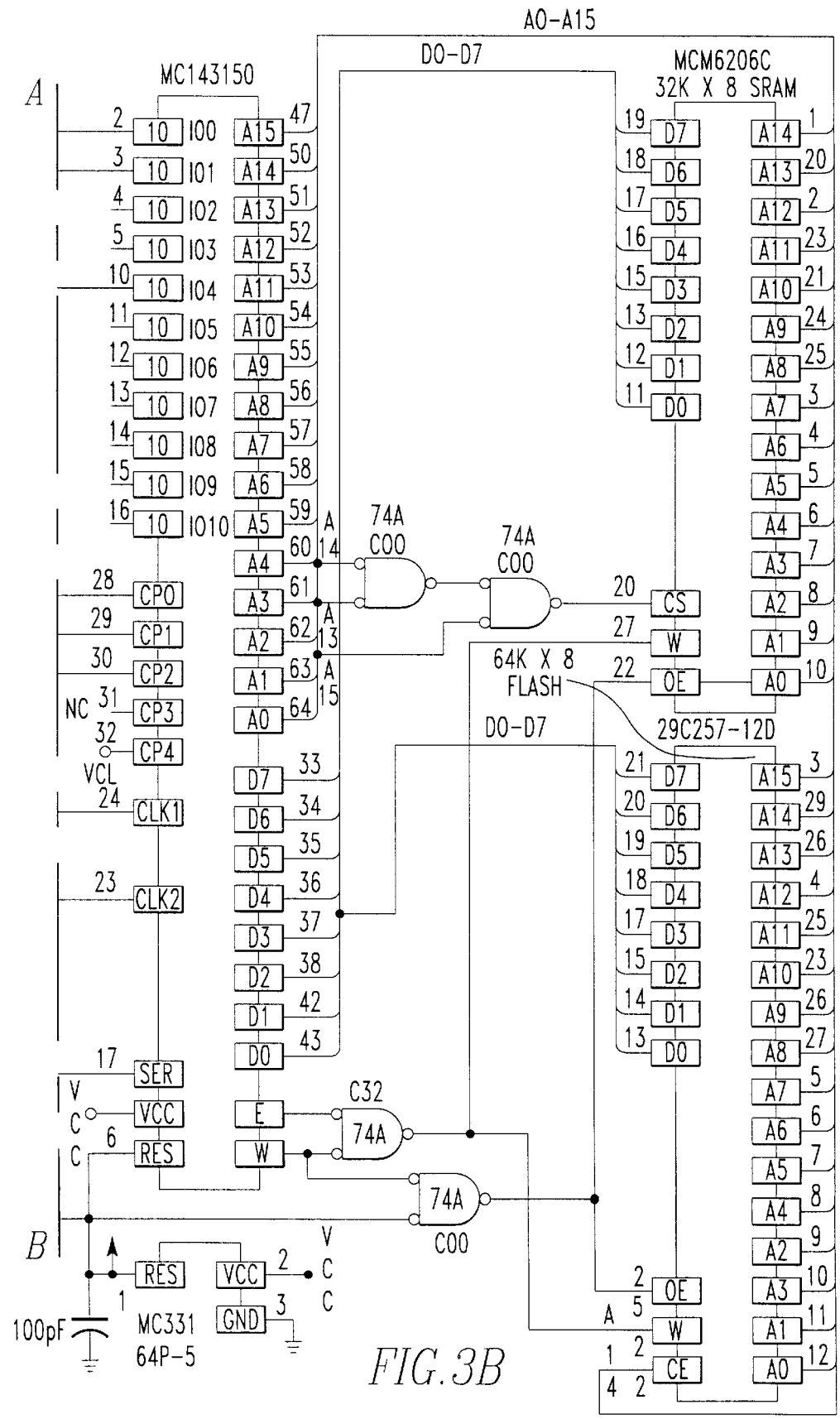
Figure 3C:
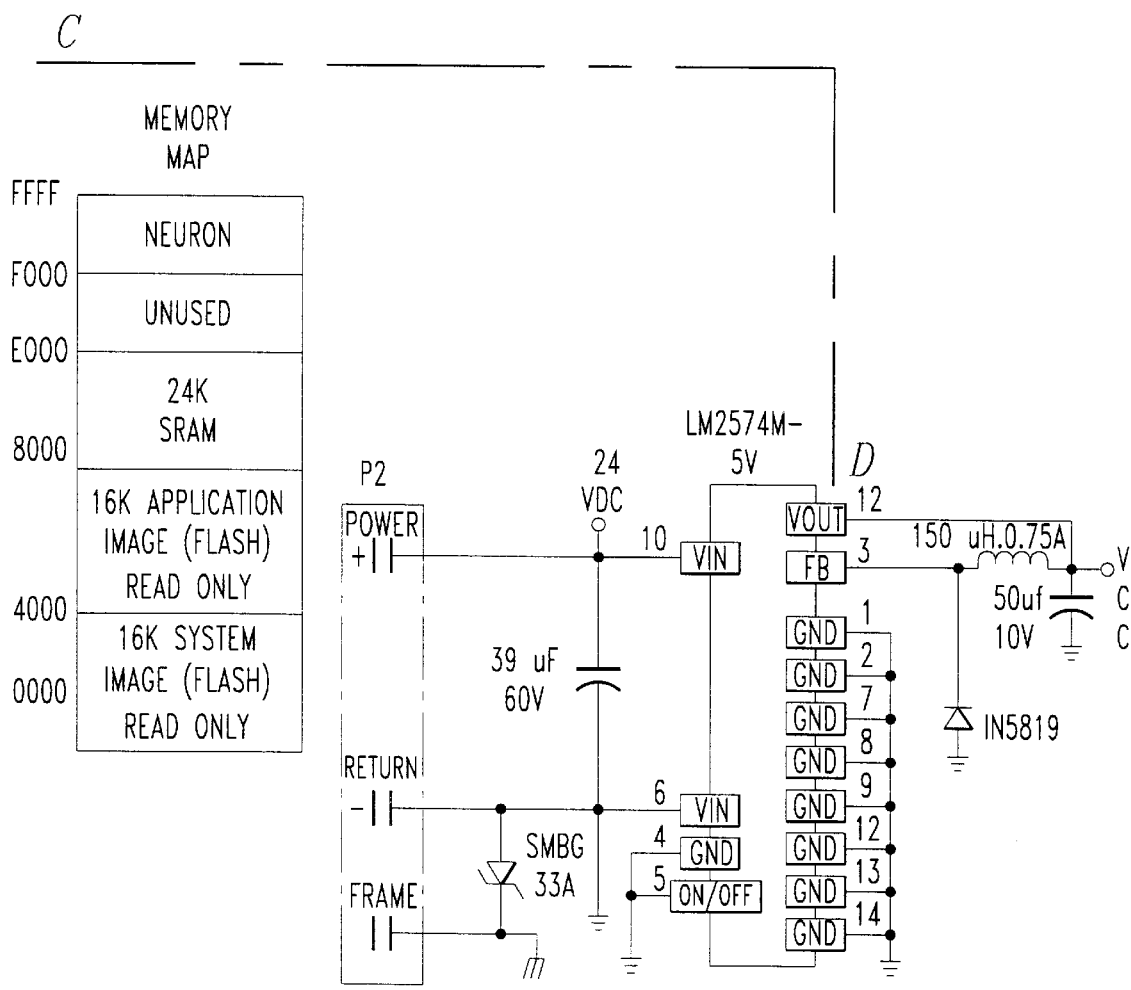

Referring to FIGS. 3a, 3b and 3c the intelligent actuator comprises the same essential circuitry as the differential airflow transducer with the exception of using the dual-slope input object to measuring actuator position feedback via a potentiometer (if needed), and the generation of a pulse-width (duty-cycle) modulated wave via a pulse-width output object which is filtered to produce an analog voltage which is a position command to the actuator. The actuator and the damper are standard, whose operation is well known, once the actuator receives the analog voltage.

Note that the analog voltage does not have to be precise, just monotonic, if feedback is used. The analog voltage actuator command could just as well be replaced by a 2 bit up and down command to directional power switches which could control the actuator motor directly, again relying on the feedback for actual position control. Additionally, the analog input used for feedback could be replaced with the quadrature-detect input object used in conjunction with an optical (or mechanical) encoder to determine position (if needed). With this encoder, not only position but velocity as well can be inferred for minimal overshoot within the intelligent actuator via its own PI (D with voltage command) loop and an inner velocity loop for top speed (slew rate) regulation.

The PID loop in the differential pressure sensor bound to the actuator modifies the network variable for desired airflow (consistent with closed loop control) to achieve the desired airflow through the airflow vent (sash) regardless of actuator position error anyway.

During operation, the intelligent actuator receives the desired position network variable that is bound to this neuron and produces an output command which is a function of its known response transfer function of the attached damper. This command is the interpolation of the command value as a function of the minimum and maximum of the dampers'position, possibly modified by the use of a lookup table. Verification of the position is read back via either the dual-slope object or the quadrature object, if needed.

When the Neuron circuit shown is used as a Producing Neuron Implementation, the Analog Output Circuit section described in the Controlling Neuron Implementation section is not used.

Dual Slope Analog Input Circuit

The MC143150's IO1 (U8 pin 3, FIG. 3B) is connected to a CD4016 analog switch (U3, FIG. 3A) which along with the MC143150's IO4 (U8 pin10, FIG. 3B) which is connected to an analog circuit consisting of an LM358 Operational Amplifier (U4, FIG. 3A) section utilized as a unity gain buffer, a second an LM358 Operational Amplifier (U5, FIG. 3A) utilized as an integrator, and an LM393 Comparator (U6, FIG. 3A) together comprising a dual-slope A/D converter. The 74HC04 inverter (U2 FIG. 3A) is used to convert the CD4016 analog switch into a single pole double throw switching function.

The MC143150 firmware initiates an analog to digital conversion by calling the dual-slope I/O object within the Neuron firmware which performs the following steps; [ASSURE INTEGRATOR DISCHARGE] The MC143150's IO1 (U8 pin 3, FIG. 3B) is taken low (if not already low) to ensure that the CD4016 analog switch has connected the VREF input to the unity buffer which will cause the integrator output (U5, FIG. 3A) to slew negative via integral action and cause the comparator output (U6, FIG. 3A) to go high once its' threshold has been crossed. This is monitored via the MC143150's IO4 (U8 pin 10, FIG. 3B). [AUTO ZERO] Once this output level has or had occurred, the MC143150 then takes its' IO1 (U8 pin 3, FIG. 3B) high to cause the CD4016 analog switch to connect the input value to be measured to the analog circuit to integrate the input value. This causes the integrator output (U5, FIG. 3A) to slew positive. [INTEGRATE INPUT] Once the integrator output crosses the comparator threshold and the comparator output (U6, FIG. 3A) switches low indicating that the integrator output has crossed the zero count threshold going high, the MC143150, via an internal firmware-preset hardware down counter, then holds the analog switch connected to the input value for the firmware preset down counter period (integration period) which is the predetermined integration time. [DE-INTEGRATE AGAINST REFERENCE] Once this down counter has reached zero, hardware circuitry internal to the MC143150 then takes the IO1 (U8 pin 3, FIG. 3B) low immediately which switches the CD4016 analog switch (U3, FIG. 3A) and hence the input to the analog circuit back to the VREF causing the integrator output to now slew negative. At the same instant, the MC143150 begins incrementing the internal hardware counter and monitors the comparator output via (U6, FIG. 3A) until the output switches high indicating that the integrator has de-integrated to zero cross. The value in the MC143150 internal hardware counter now represents the analog input value which is used by the application firmware as the measured flow value.

Free Topology Transceiver Circuit

The MC143150's CP0, Transmit Data output (U8 pin 28, FIG. 3B) is connected to the FTT10 TXD input (U7 pin 7), the CP1, Data Direction output (U8 pin 29) is connected to the FTT10 RTS input (U7 pin 8), and the CP2, Receive Data input (U8 pin 30) is connected to the FTT10 RXD output (U7 pin 4) on the FTT10 Free Topology Transceiver (U7 FIG. 3A) which converts the standard Neuron single ended mode Manchester data protocol levels to the data modulation scheme used on the Free Topology network. The FTT10's CLK (U7 pin 10) is driven with the Neuron clock frequency from the MC143150's CLK2 (U8 pin 23). The FTT10's RES input is driven by the MC33164P-5 Reset Controllers' output (U15 pin 1, FIG. 3B). The FTT10 produces its' output on the A (U7 pin 6) and B (U7 pin 5) pins which are coupled to the Free Topology network via the 22 uF 50 V capacitors to the LON A and LON B output connectors. These capacitors are used to block DC voltage components when the Free Topology network is used with network powered transceivers. The 1N4004 and BAV99 diodes on the A and B outputs are used in conjunction with the 0.001 uF 1000V capacitor and the PCB spark gaps to perform transient protection for the FTT10. The BAV99 diodes on the T1 (U7 pin 11) and the T2 (U7 pin 12) are used for transient protection on the FTT10s' secondary side of its' internal coupling transformer.

System Clock Circuit

The 10 MHZ crystal (FIG. 3A) along with the two 30 pF capacitors and the 270 and 100K ohm resistors connected to the MC143150's CLK1 (U8 pin 24, FIG. 3B) and CLK2 (U8 pin 23) forming the system clock oscillator.

Service Pin Circuit

The Yellow LED (FIG. 3A) along with the 150 ohm resistor and the Service Button and 10 ohm resistor form the indication and actuation of the Service request/grant function which is connected to the MC143150's SER input (U8 pin 17, FIG. 3B) used by the Neuron for network binding.

Processing Node Circuit

The MC143150 (U8 FIG. 3B) Neuron Processor is connected to the MCM6206C SRAM (Data and stack working memory) (U13 FIG. 3B) and to the 29C257-12D Flash ROM (Application Program and data storage) (U14 FIG. 3B). Note that the MC143150s' Address lines (A0 through A15) and the Data lines (D0 through D7) are connected common to each of these three devices. The 74AC00's (U9 and U10 FIG. 3B) decode A13, A14, and A15 for the SRAM's' active low Chip Enable (U13 pin 22) for address space (hex 8000 through hex DFFF) per the memory map (FIG. 3C). The address line A15 is used to decode the 29C257-12D Flash ROM's' active low Chip Enable (U14 pin 22) for address space (hex 0000 through hex 7FFF) per the memory map (FIG. 3C). The 74AC32 (U1 1 FIG. 3B) is used to decode the active low Write Enable via the MC143150s' E (U8 pin X) and W (U8 pin X), and the 74AC00 (U12 FIG. 3B) is used to decode the active low Output Enable via the MC143150s' W (U8 pin X) and RES (U8 pin X), both of which are connected common to the MCM6206C SRAM and 29C257-12D Flash ROM. Note that these aforementioned devices comprise a processing node that executes an application program in a manner well known to those skilled in microprocessor circuit design.

System Reset Circuit

The MC33164P-5 reset controller (U15 FIG. 3B) monitors the 5 volt power supply for an out of tolerance condition and as a result also generates the power on reset function. The reset output (U15 pin 1) is connected to the MC143150 (U8 pin 6) and the FTT10 (U7 pin 9) where it performs power on reset, and to the 74AC00 (U12) where it prevents spurious memory writes during low voltage conditions.
Power Supply Circuit The LM2574M-5V step down switch mode regulator (U16 FIG. 3C) is used to develop the regulated +5 volts used for system power (VCC) from an unregulated input power of approximately 24 volts DC. The 39 uF 60 V input capacitor filters the input voltage. The SMBG33A transzorb prevents transients on the input. The 150 uH inductor stores the switched energy via its magnetic field, the 1N5819 Shottky diode acts as a catch or free wheeling diode for negative excursions on the inductor, and the 50 uF 10 V capacitor filters the inductors output in order to supply a regulated +5 volt output.

CONTROLLING NEURON IMPLEMENTATION

When the particular Neuron circuit shown in FIGS. 3A, 3B, and 3C is used as a Controlling Neuron, the Dual Slope Analog Input Circuit section described in the Producing Neuron Implementation section is not used.

Analog Output Circuit

The MC143150's IO0 (U8 pin 2, FIG. 3B) is connected to an LM358 Operational Amplifier (U1, FIG. 3A) utilized as a 2 pole low pass filter which by low pass filtering, converts a constant frequency, variable duty-cycle pulse train to a variable DC output voltage in the range of 0–5 volts. This is the control voltage to the actuator.

Free Topology Transceiver Circuit

The MC143150's CP0, Transmit Data output (U8 pin 28, FIG. 3B) is connected to the FTT10 TXD input (U7 pin 7), the CP1, Data Direction output (U8 pin 29) is connected to the FTT10 RTS input (U7 pin 8), and the CP2, Receive Data input (U8 pin 30) is connected to the FTT10 RXD output (U7 pin 4) on the FTT10 Free Topology Transceiver (U7 FIG. 3A) which converts the standard Neuron single ended mode Manchester data protocol levels to the data modulation scheme used on the Free Topology network. The FTT10's CLK (U7 pin 10) is driven with the Neuron clock frequency from the MC143150's CLK2 (U8 pin 23). The FTT10's RES input is driven by the MC33164P-5 Reset Controllers' output (UL5 pin 1, FIG. 3B). The FTT10 produces its' output on the A (U7 pin 6) and B (U7 pin 5) pins which arc coupled to the Free Topology network via the 22 uF 50 V capacitors to the LON A and LON B output connectors. These capacitors are used to block DC voltage components when the Free Topology network is used with network powered transceivers. The 1N4004 and BAV99 diodes on the A and B outputs are used in conjunction with the 0.001 uF 1000 V capacitor and the PCB spark gaps to perform transient protection for the FTT10. The BAV99 diodes on the T1 (U7 pin 11) and the T2 (U7 pin 12) arc used for transient protection on the FTT10s' secondary side of its' internal coupling transformer.

System Clock Circuit

The 10 MHz crystal (FIG. 3A) along with the two 30 pF capacitors and the 270 and 100 K ohm resistors connected to the MC143150's CLK1 (U8 pin 24, FIG. 3B) and CLK2 (U8 pin 23) forming the system clock oscillator.

Service Pin Circuit

The Yellow LED (FIG. 3A) along with the 150 ohm resistor and the Service Button and 10 ohm resistor from the indication and actuation of the Service request/grant function which is connected to the MC143150's SER input (U8 pin 17, FIG. 3B) used by the Neuron for network binding.

Processing Node Circuit

The MC143150 (U8 FIG. 3B) Neuron Processor is connected to the MCM6206C SRAM (Data and stack working memory) (U13 FIG. 3B) and the 29C257-12D Flash ROM (Application Program and data storage) (U14 FIG. 3B). Note that the MC143150s' Address lines (A0 through A15) and the Data lines (D0 through D7) are connected common to each of these three devices. The 74AC00's (U9 and U10 FIG. 3B) decode A13, A14, and A15 for the SRAM's' active low Chip Enable (U13 pin 22) for address space (hex 8000 through hex DFFF) per the memory map (FIG. 3C). The address line A15 is used to decode the 29C257-12D Flash ROM's' active low Chip Enable (U14 pin 22) for address space (hex 0000 through hex 7FFF) per the memory map (FIG. 3C). The 74AC32 (U1 1 FIG. 3B) is used to decode the active low Write Enable via the MC143150s' E (U8 pin X) and W (U8 pin X), and the 74AC00 (U12 FIG. 3B) is used to decode the active low Output Enable via the MC143150s' W (U8 pin X) and RES (U8 pin X), both of which are connected common to the MCM6206C SRAM and 29C257-12D Flash ROM. Note that these aforementioned devices comprise a processing node that executes an application program in a manner well known to those skilled in microprocessor circuit design.

System Reset Circuit

The MC33164P-5 reset controller (U15 FIG. 3B) monitors the 5 volt power supply for an out of tolerance condition and as a result also generates the power on reset function. The reset output (U15 pin 1) is connected to the MC143150 (U8 pin 6) and the FTT10 (U7 pin 9) where it performs power on reset, and to the 74AC00 (U12) where it prevents spurious memory writes during low voltage conditions

Power Supply Circuit

The LM2574M-5V step down switch mode regulator (U16 FIG. 3C) is used to develop the regulated +5 volts used for system power (VCC) from an unregulated input power of approximately 24 volts DC. The 39 uF 60 V input capacitor filters the input voltage. The SMBG33A transform prevents transients on the input. The 150 uH inductor stores the switched energy via its magnetic field, the 1N5819 Shottky diode acts as a catch or free wheeling diode for negative excursions on the inductor, and the 50 uF 10 V capacitor filters the inductors output in order to supply a regulated +5 volt output.

The use of "means" herein is pursuant to 35 U.S.C. §112, while the use of "mechanism" herein is not subject to 35 U.S.C. §112.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

```
//-------------------------------------------------------------
// Compiler Directives
//-------------------------------------------------------------
#pragma relaxed_casting_on
//-------------------------------------------------------------
// Include Files
//-------------------------------------------------------------
#include <FLOAT.H>
#include <STRING.H>
#include <SNVT_AL.H>
#include <SNVT_PR.H>
//-------------------------------------------------------------
// Network Variable Declarations
//-------------------------------------------------------------
// SYSTEM
//                                              1234567890123456
network input  onchip SNVT_time_stamp   nviDateTime;
network output onchip SNVT_alarm        nvoAlarmStatus;
network input  onchip SNVT_alarm        nviEmergency;
network output onchip SNVT_lev_cont_f   nviEmerPosition;
network input  eeprom SNVT_str_asc      nviName = {'H', 'o', 'o', 'd', '_', '1', '\0'};
// FACE VELOCITY SENSOR
network input  eeprom SNVT_count        nviFVReadRate    = 20;
network input  eeprom SNVT_speed_f      nviDPLowScale;
network input  eeprom SNVT_speed_f      nviDPHighScale;
network input  eeprom SNVT_speed_f      nviFVLowLimit;
network input  eeprom SNVT_speed_f      nviFVHighLimit;
network output onchip SNVT_speed_f      nvoFaceVelocity;
// FACE VELOCITY CONTROL LOOP
network input  eeprom SNVT_speed_f      nviPIDSetpoint;
network input  eeprom SNVT_lev_cont_f   nviPIDProp;
network input  eeprom SNVT_lev_cont_f   nviPIDIntegral;
network input  eeprom SNVT_lev_cont_f   nviPIDDerivative;
network input  eeprom SNVT_speed_f      nviPIDDeadband;
network input  eeprom SNVT_count_inc    nviPIDSign;
network input  eeprom SNVT_switch       nviPIDEnable;
network output onchip SNVT_lev_cont_f   nvoPIDOut;
//-------------------------------------------------------------
// I/O Objects
//-------------------------------------------------------------
IO_4 input dualslope ded clock(0) ADConvertor;
//-------------------------------------------------------------
// Timers
//-------------------------------------------------------------
mtimer repeating ConvertTimer;
//-------------------------------------------------------------
// Defines
//-------------------------------------------------------------
#define LOW_COUNTS          00000UL
#define HIGH_COUNTS         65535UL
#define CONTROL_VALUE       45000UL
#define ON                  1
#define OFF                 0
#define NO_ALARM            0U
#define LOW_LIMIT_ALARM     1U
#define HIGH_LIMIT_ALARM    2U
#define OBJECT_ID           0UL
#define SPEED_SNVT_INDEX    62UL
//-------------------------------------------------------------
// Global Variable Declarations
//-------------------------------------------------------------
// Regular Variables
```

APPENDIX-continued

```
unsigned long    RawCounts;        //Differential Pressure in Raw Counts
float_type       DiffPressure;     //Differential Pressure
float_type       Error;            //PID Error
float_type       PrevError;        //PID Previous Error
float_type       PPart;            //PID Proportional Component
float_type       IPart;            //PID Integral Component
float_type       DPart;            //PID Deriviative Componet
// Floating Point Defines
float_type       AIR_COEF;         //Coefficient of Air
float_type       PID_MAX_OUT;      //PID Loop Maximum Output
float_type       PID_MIN_OUT;      //PID Loop Minimum Output
float_type       ZERO;             //A floating point zero
//------------------------------------------------------------------------
// Function Prototypes
//------------------------------------------------------------------------
    void      Alarm(void);
    int       CechkForAlarm(void);
    void      ReportAlarm(    unsigned long    object_id,
                              alarm_type_t     alarm_type,
                              priority_level_t priority_level,
                              unsigned long    index_to_SNVT,
                              unsigned         value[4],
                              unsigned         alarm_limit[4]);
    void      PID(void);
    boolean   DeadBand(void);
    void      FillArray(  SNVT_speed_f   * Speed_f,
                          unsigned       * Value);
//------------------------------------------------------------------------
// Reset
//------------------------------------------------------------------------
when (reset)
{
    // Setup the Read Rate for the analog input
    ConvertTimer = (unsigned long) nviFVReadRate;
    // Evaluate the Coefficient of Air define
    fl_from_ascii("4.037", &AIR_COEF);
    // Evaluate the PID Loop's Maximum Output define
    fl_from_ascii("100", &PID_MAX_OUT);
    // Evaluate the PID Loop's Minimum Output define
    fl_from_ascii("0", &PID_MIN_OUT);
    // Evaluate the Zero Value define
    ZERO = fl_zero;
}
//------------------------------------------------------------------------
// Face Velocity Convertion Timer Expired
//------------------------------------------------------------------------
when (timer_expires (ConvertTimer))
{
    //Start the first integration period for the A/D convertor
    //(9ms @ 10MHz)
    io_in_request(ADConvertor, CONTROL_VALUE);
}
//------------------------------------------------------------------------
// The A/D convertor has a new value
//------------------------------------------------------------------------
when (io_update_occurs(ADConvertor))
    float_type       wr0_f;   //Tempory Float Variable 1
    float_type       wr1_f;   //Tempory Float Variable 2
    unsigned long    wr0_ul;  //Tempory Long Integer Variable
    // The differential pressure input value is biased by the negative value
    // of the control value used. Correct this by adding it back
    RawCounts = input_value + CONTROL_VALUE;
    // Scale the Raw Counts to a Differential Pressure
    //        (RawCounts – LOW_COUNTS) * (nviDPHighScale – nviDPLowScale)
```

$$
// \ DP = \frac{(RawCounts - LOW\_COUNTS) * (nviDPHighScale - nviDPLowScale)}{(HIGH\_COUNTS - LOW\_COUNTS)} + nviDPLowScale
$$

```
    //                    (HIGH_COUNTS – LOW_COUNTS)
    // Perform the above equation using the floating point library
    wr0_ul = RawCounts – LOW_COUNTS;
    fl_from_ulong( wr0_ul, &wr0_f);
    fl_sub( (const float_type *) &nviDPHighScale,
            (const float_type *) &nviDPLowScale, &wr1_f);
    fl_mul( &wr0_f, &wr1_f, &DiffPressure);
    wr0_ul = HIGH_COUNTS – LOW_COUNTS;
```

APPENDIX-continued

```
        f1_from_ulong( wr0_ul, &wr0_f);
        f1_mul( &wr0_f, &DiffPressure, &wr1_f);
        f1_add( &wr1_f, (const float_type *) &nviDPLowScale, &DiffPressure);
        // Convert the Differential Pressure to a Face Velocity
        // nviFaceVelocity = 4.037 sqr(DiffPressure)
        f1_sqrt( &DiffPressure, &wr0_f);
        f1_mul( &wr0_f, &AIR_COEF, &wr0_f);
        nvoFaceVelocity = * (SNVT_speed_f *) &wr0_f;
        //Perform the Alarming Task
        Alarm( );
        // Perform the PID Control Loop
        // Do PID control if its enabled
        if (nviPIDEnable.state == ON)
        {
            // Only Perform PID Control If were not in Emergency
            if (nviEmergency.state == ON)
            {
                nvoPIDOut = nviEmerPosition;
            }
            // Only Perform PID Control If the face velocity is outside
            // the DeadBand
            else if (DeadBand)
            {
                PID( );
            }
        }
}
//----------------------------------------------------------------------
// Check for High or Low Limit Alarms
//----------------------------------------------------------------------
int CheckForAlarm( )
{
    // Check if there is a high face velocity alarm
    if ( f1_gt(  (const float_type *) &nvoFaceVelocity,
                (const float_type *) &nviFVHighLimit) )
    {
        return (HIGH_LIMIT_ALARM);
    }
    // Check if there is a low face velocity alarm
    else if ( f1_lt(  (const float_type *) &nvoFaceVelocity,
                     (const float_type *) &nviFVLowLimit) )
    {
        return (LOW_LIMIT_ALARM);
    }
    return (NO_ALARM);
}
//----------------------------------------------------------------------
// Alarm   Check for High and Low Limit Alarms and Clears
//----------------------------------------------------------------------
void Alarm( )
{
    int             AlarmStatus;   // Current Alarm Status
    SNVT_speed_f    wr0_speed;     // Temp Variable of Speed Type
    unsigned        Speed[4];      // Copy of the face velocity
    unsigned        Limit[4];      // Copy of the alarm limit
    // Get the Current Alarm Status
    AlarmStatus = CheckForAlarm( );
    // Fill the Unsigned Face Velocity Array with the floating
    // point number
    wr0_speed = nvoFaceVelocity;
    FillArray( &wr0_speed,
                (unsigned *) &Speed);
    //Set the alarm status to our previous alarm condition
    switch(nvoAlarmStatus.alarm_type)
    {
        //Previous alarm was a low limit clear
        case AL_LOW_LMT_CLR_1:
        case AL_HIGH_LMT_CLR_1:
        case AL_NO_CONDITION:
            // Set the alarm status accordingly
            switch(AlarmStatus)
            {
                // There is a low limit alarms
                case LOW_LIMIT_ALARM:
                    // Fill the Alarm Limit with the Low Limit value
                    FillArray( &nviFVLowLimit,
                                (unsigned *) &Limit );
                    // Report the Alarm
                    ReportAlarm( OBJECT_ID,
```

APPENDIX-continued

```
                            AL_LOW_LMT_ALM_1,
                            PR_LEVEL_3,
                            SPEED_SNVT_INDEX,
                            Speed,
                            Limit );
                break;
            // There is a high limit alarms
            case HIGH_LIMIT_ALARM:
                // Fill the Alarm Limit with the High Limit value
                FillArray(   &nviFVHighLimit,
                            (unsigned *) &Limit );
                // Report the alarm
                ReportAlarm(  OBJECT_ID,
                            AL_HIGH_LMT_ALM_1,
                            PR_LEVEL_3,
                            SPEED_SVNT_INDEX,
                            Speed,
                            Limit );
                break;
            // Default Condition
            default:
                // Fill the Alarm Limit with a zero value
                FillArray(  (SNVT_speed_f *) &ZERO,
                            (unsigned *) &Limit );
                // Report the alarm
                ReportAlarm(  OBJECT_ID,
                            AL_NO_CONDITION,
                            PR_LEVEL_3,
                            SPEED_SNVT_INDEX,
                            Speed,
                            Limit );
            }
            break;
    // Previous alarm was a low limit alarm
    case AL_LOW_LMT_ALM_1:
            // Set the alarm status accordingly
            switch(AlarmStatus)
            {
                // If there is a high limit alarm or no alarm
                // clear the low limit alarm
                case HIGH_LIMIT_ALARM:
                case NO_ALARM:
                    // Fill the Alarm Limit with the Low Limit value
                    FillArray(   &nviFVLowLimit,
                                *unsigned *) &Limit );
                    // Report the alarm
                    ReportAlarm(  OBJECT_ID,
                                AL_LOW_LMT_CLR_1,
                                PR_LEVEL_3,
                                SPEED_SNVT_INDEX,
                                Speed,
                                Limit );
                    break;
                // If there is still a low limit alarm do nothing
                case LOW_LIMIT_ALARM:
                    break;
                // Default Condition
                default:
                    // Fill the Alarm Limit with zero
                    FillArray(  (SNVT_speed_f *) &ZERO,
                                (unsigned *) &Limit );
                    // Report the alarm
                    ReportAlarm(  OBJECT_ID,
                                AL_NO_CONDITION,
                                PR_LEVEL_3,
                                SPEED_SNVT_INDEX,
                                Speed,
                                Limit );
            }
            break;
    // Previous alarm was a high limit alarm
    case AL_HIGH_LMT_ALM_1:
            // Set the alarm status accordinly
            switch(AlarmStatus)
            {
                // If there is a low limit alarm or no alarm clear
                // the high limit alarm
                case LOW_LIMIT_ALARM:
                case NO_ALARM:
```

APPENDIX-continued

```
                    // Fill the Alarm Limit with the High Limit value
                    FillArray(  &nviFVHighLimit,
                                (unsigned *) &Limit );
                    // Report the alarm
                    ReportAlarm(    OBJECT_ID,
                                    AL_HIGH_LMT_CLR_1,
                                    PR_LEVEL_3,
                                    SPEED_SNVT_INDEX,
                                    Speed,
                                    Limit );
                    break;
                // If there is still a high limit alarm, do nothing
                case HIGH_LIMIT_ALARM:
                    break;
                // Default Condition
                default:
                    // Fill the Alarm Limit with zero
                    FillArray(  (SNVT_speed_f *) &ZERO,
                                (unsigned *) &Limit );
                    // Report the alarm
                    ReportAlarm (   OBJECT_ID,
                                    AL_NO_CONDITION,
                                    PR_LEVEL_3,
                                    SPEED_SNVT_INDEX,
                                    Speed,
                                    Limit );
            }
            break;
    }
}
//------------------------------------------------------------------------
// Report Alarms
//------------------------------------------------------------------------
void    ReportAlarm(    unsigned long       ObjectID,
                        alarm_type_t        AlarmType,
                        priority_level_t    PriorityLevel,
                        unsigned long       IndexToSNVT,
                        unsigned            Value[4],
                        unsigned            AlarmLimit[4])
{
    // Fill the in the passed alarm information
    strcpy( ( char *) &nvoAlarmStatus.location, (char *) &nviName);
    nvoAlarmStatus.object_id = ObjectID;
    nvoAlarmStatus.alarm_type = AlarmType;
    nvoAlarmStatus.priority_level = PriorityLevel;
    nvoAlarmStatus.index_to_SNVT = IndexToSNVT;
    // Fill the Current Face Velocity Value
    nvoAlarmStatus.value[0] = Value[0];
    nvoAlarmStatus.value[1] = Value[1];
    nvoAlarmStatus.value[2] = Value[2];
    nvoAlarmStatus.value[3] = Value[3];
    // Fill the Alarm Limit Value
    nvoAlarmStatus.alarm_limit[0] = AlarmLimit[0];
    nvoAlarmStatus.alarm_limit[1] = AlarmLimit[1];
    nvoAlarmStatus.alarm_limit[2] = AlarmLimit[2];
    nvoAlarmStatus.alarm_limit[3] = AlarmLimit[3];
    // Fill in the current time and date
    nvoAlarmStatus.year = nviDateTime.year;
    nvoAlarmStatus.month = nviDateTime.month;
    nvoAlarmStatus.day = nviDateTime.day;
    nvoAlarmStatus.hour = nviDateTime.hour;
    nvoAlarmStatus.minute = nviDateTime.minute;
    nvoAlarmStatus.second = nviDateTime.second;
}
//------------------------------------------------------------------------
// FillArray
// Takes a floating point speed variable and fills an unsigned 4 byte
// array with it.
//------------------------------------------------------------------------
void FillArray( SNVT_speed_f * value_f,
                unsigned * value)
{
    char *ptr1, *ptr2;          // Set up some temp pointers
    // Assign the address for the pointers
    ptr1 = (char *) value_f;
    ptr2 = (char *) value;
    // Copy the floating point number to the unsigned array
    *ptr2++ = *ptr1++;
    *ptr2++ = *ptr1++;
```

APPENDIX-continued

```
        *ptr2++ = *ptr1++;
        *ptr2   = *ptr1;
}
//------------------------------------------------------------------------
// DeadBand
// Returns TRUE if the Face Velocity is outside the deadband
// Returns FALSE if the Face Velocity is inside the deadband
//------------------------------------------------------------------------
boolean DeadBand( )
{
        float_type temp0_f;    // Tempory Floating Point Variable 1
        float_type temp1_f;    // Tempory Floating Point Variable 2
        // Get half of the DeadBand
        temp0_f = f1_half;
        f1_mul( (const float_type *) &nviPIDDeadband, &temp0_f, &temp1_f);
        // Check the higher limit
        f1_add( (const float_type *) &nviPIDSetpoint, &temp1_f, &temp0_f);
        if (f1_gt( (const float_type *) &nvoFaceVelocity, &temp0_f) )
        {
                return (TRUE);
        }
        // Check the lower limit
        f1_sub( (const float_type *) &nviPIDSetpoint, &temp1_f, &temp0_f);
        if (f1_lt( (const float_type *) &nvoFaceVelocity, &temp0_f) )
        {
                return (TRUE);
        }
        // The face velocity is inside the deadband
        return (FALSE);
}
//------------------------------------------------------------------------
// PID Control Loop
//------------------------------------------------------------------------
void PID( )
{
        float_type temp0_f;    // Tempory Floating Point Variable 1
        float_type temp1_f;    // Tempory Floating Point Variable 2
        // Calculate the error
        if (nviPIDSign >= 0)
        {
                // Normal Control Sign
                // Error = nviPIDSetpoint - nvoFaceVelocity
                f1_sub( (const float_type *) &nviPIDSetpoint,
                        (const float_type *) &nvoFaceVelocity,
                        &Error);
        }
        else
        {
                // Reverse Control Sign
                // Error = nvoFaceVelocity - nviPIDSetpoint
                f1_sub( (const float_type *) &nvoFaceVelocity,
                        (const float_type *) &nviPIDSetpoint,
                        &Error);
        }
        // Calculate the Proportion Component
        // PPart = Error * nviPIDProp
        f1_mul(  &Error,
                 (const float_type *) &nviPIDProp,
                 &PPart);
        // Calculate the Integral Component
        // IPart = IPart + nviPIDIntegral * Error
        f1_mul(  (const float_type *) &nviPIDIntegral,
                 &Error,
                 &temp0_f);
        f1_add(  &IPart,
                 &temp0_f,
                 &IPart);
        // Calculate the Derivative Component
        // DPart = (Error - PrevError) * nviPIDDerivative
        f1_sub(  &Error,
                 &PrevError,
                 &temp0_f);
        f1_mul(  &temp0_f,
                 (const float_type *) &nviPIDDerivative,
                 &DPart);
        // Add all the PID components together
        // TemporyOut = PPart + IPart + DPart
        f1_add(  &PPart,
                 &IPart,
```

APPENDIX-continued

```
                &tempo0_f);
    f1_add(     &tempo0_f,
                &DPart,
                &temp0_f);
    // Watch for positive anti-reset windup
    // if TemporyOut > PID_MAX_OUT - TemporyOut
    //     IPart = IPart + PID_MAX_OUT then
    //     TemporyOut = PID_MAX_OUT
    if ( f1_gt( &temp0_f, &PID_MAX_OUT) )
        f1_add(&IPart, &PID_MAX_OUT, &temp1_f);
        f1_sub(&temp1_f, &temp0_f, &IPart);
        temp0_f = PID_MAX_OUT;
    }
    // Watch for negative anti-reset windup
    // if TemporyOut < PID_MIN_OUT then
    //     IPart = IPart + PID_MIN_OUT - TemporyOut
    //     TemporyOut = PID_MIN_OUT
    if ( f1_lt( &temp0_f, &PID_MIN_OUT) )
    {
        f1_add(&IPart, &PID_MIN_OUT , &temp1_f);
        f1_sub(&temp1_f, &temp0_f, &IPart);
        temp0_f = PID_MIN_OUT;
    }
    // Save the PID Output
    // nvoPIDOut = TemporyOut
    nvoPIDOut = * (SNVT_lev_cont_f *) &tempo0_f;
    // Update the Previous Error
    PrevError = Error;
}
```

What is claimed is:

1. A system for directing air flow in a fume hood having a sash comprising:
   a mechanism for producing an output control signal corresponding to a desired flow of air through the sash of the fume hood, said producing mechanism comprising a producing CPU having its own intelligence which actively produces the output control signal, said producing mechanism to be disposed in fluid communication with the fume hood;
   a mechanism for controlling air flow through the sash of the fume hood corresponding to the output control signal, said controlling mechanism connected to the producing mechanism to receive the output control signal, said controlling mechanism comprising a controlling CPU having its own intelligence which actively produces a drive signal for operating the controlling mechanism corresponding to the output control signal, said producing mechanism and said controlling mechanism forming a fully distributed intelligent non-hierarchical architecture; and
   a network to which the producing mechanism and the controlling mechanism are connected to communicate with each other, the producing mechanism and the controlling mechanism each having a network circuit which provides a communication network variable to the network so the producing mechanism and the controlling mechanism can communicate with each other.

2. A system as described in claim 1 wherein the producing mechanism comprises a mechanism for creating an air flow signal corresponding to the air flow to the fume hood, said air flow signal provided to the producing CPU, said producing mechanism connected to the creating mechanism.

3. A system as described in claim 2 wherein the creating mechanism comprises an air foil pitot in contact with the fume hood and in communication with the producing CPU, said air foil pitot detects the air pressure in regard to the fume hood, said air foil pitot in communication with the producing CPU.

4. A system as described in claim 3 wherein the creating mechanism further comprises an ultra-low differential pressure sensor connected to the air foil pitot and the producing CPU which creates the air flow signal.

5. A system as described in claim 4 wherein the controlling mechanism further comprises an actuator in which the controlling CPU is disposed and is operated by the drive signal.

6. A system as described in claim 5 wherein the controlling mechanism further comprises a damper connected to the actuator which is operated by the actuator.

7. A system as described in claim 6 wherein the producing mechanism further comprises a differential face velocity sensor, said producing CPU disposed in the producing mechanism.

8. A method for controlling air flow in a fume hood comprising the steps of:
   measuring air flow in a fume hood to identify a measured air flow;
   producing a communication network variable corresponding to a desired flow of air through the fume hood based on the measured air flow with a producing processor;
   transmitting the communication network variable over a network;
   receiving the communication network variable at a device with a controlling processor which controls air flow through the fume hood, said controlling processor independent of the producing processor, said controlling processor and producing processor forming a fully distributed intelligent non-hierarchical architecture; and
   controlling the air flow through the fume hood with the device based on the communication network variable which has been processed by the controlling processor.

9. A system for maintaining a desired relationship regarding air comprising:
   a first room;
   a second room separated from but connected to the first room by a wall with an interface through which air could pass when the interface is in an open state, said first room having means or a mechanism for producing a communication network variable corresponding to a desired condition of air in the first room so air will only flow from the second room into the first room, said first room having means or a mechanism for controlling the condition of the air in the first room based on the communication network variable received from the producing means or mechanism, said producing means or mechanism having a producing CPU and said controlling means or mechanism having a controlling CPU; and a network to which the producing means or mechanism and the controlling means or mechanism are connected to communicate with each other, said producing means or mechanism and said controlling means or mechanism forming a fully distributed intelligent non-hierarchical architecture.

* * * * *